United States Patent
Taniguchi et al.

(10) Patent No.: US 8,486,529 B2
(45) Date of Patent: Jul. 16, 2013

(54) FINE METAL CARBIDE PARTICLES AND METHODS OF MANUFACTURING THE SAME

(75) Inventors: Yoko Taniguchi, Fukuoka (JP); Akihisa Makino, Fukuoka (JP); Kunitaka Fujiyoshi, Fukuoka (JP); Masashi Arimura, Fukuoka (JP); Shuji Ueno, Saga (JP); Mitsui Koga, Saga (JP)

(73) Assignees: Fukuoka Prefecture, Fukuoka (JP); Nippon Tungsten Co., Ltd., Fukuoka (JP)

( * ) Notice: Subject to any disclaimer, the term of this patent is extended or adjusted under 35 U.S.C. 154(b) by 106 days.

(21) Appl. No.: 13/143,419

(22) PCT Filed: Jan. 6, 2010

(86) PCT No.: PCT/JP2010/000056
§ 371 (c)(1),
(2), (4) Date: Jul. 6, 2011

(87) PCT Pub. No.: WO2010/079752
PCT Pub. Date: Jul. 15, 2010

(65) Prior Publication Data
US 2011/0268969 A1    Nov. 3, 2011

(30) Foreign Application Priority Data
Jan. 7, 2009 (JP) ................ 2009-002085

(51) Int. Cl.
*B32B 5/16* (2006.01)

(52) U.S. Cl.
USPC .............. 428/402; 427/212; 423/409; 501/87

(58) Field of Classification Search
USPC .............. 428/402; 427/212; 423/409; 501/87
See application file for complete search history.

(56) References Cited

U.S. PATENT DOCUMENTS

| | | | |
|---|---|---|---|
| 5,919,428 A | 7/1999 | Gao et al. | |
| 6,197,272 B1 * | 3/2001 | Womelsdorf et al. | 423/409 |
| 6,293,989 B1 | 9/2001 | Kim et al. | |
| 6,852,304 B2 | 2/2005 | Yaginuma et al. | |
| 7,915,187 B2 * | 3/2011 | Taniguchi et al. | 501/87 |
| 8,148,281 B2 * | 4/2012 | Taniguchi et al. | 501/87 |

FOREIGN PATENT DOCUMENTS

| | | |
|---|---|---|
| JP | 10-194717 | 7/1998 |
| JP | 10-259057 | 9/1998 |
| JP | 10-310473 | 11/1998 |
| JP | 10/310473 | * 11/1998 |
| JP | 2001/072406 | * 3/2001 |
| JP | 2001-72406 | 3/2001 |
| JP | 2001-73012 | 3/2001 |
| JP | 2003-112916 | 4/2003 |
| JP | 2005-335997 | 12/2005 |
| JP | 2008/105936 | * 5/2008 |
| JP | 2008-105936 | 5/2008 |

OTHER PUBLICATIONS

International Search Report issued Apr. 13, 2010 in International (PCT) Application No. PCT/JP2010/000056.
Preiss et al., "Carbothermal Synthesis of Vanadium and Chromium Carbides from Solution-Derived Precursors", *Journal of the European Ceramic Society*, vol. 19, pp. 187-184, 1999.
Yamashita et al., "Preparation of the Nanosized Tungsten Carbide Particle Using Citric Acid as Carbon Source", Abstracts of the 36th Annual Meeting of the Carbon Society of Japan, pp. 242-243, 2009.

* cited by examiner

*Primary Examiner* — Leszek Kiliman
(74) *Attorney, Agent, or Firm* — Wenderoth, Lind & Ponack, L.L.P.

(57) ABSTRACT

There is provided fine metal carbide particles which do not require pulverization of an initial material, a reaction intermediate and a product that causes the contamination with metallic impurities, which can promote a carbonization reaction uniformly at a lower temperature than in the past, and which can be manufactured at a low cost; and a method of manufacturing the same. The fine metal carbide particles are prepared by heat-treating, in a nonoxidizing atmosphere or a vacuum atmosphere, a solid obtained by drying an aqueous metal complex solution containing a water-soluble metal compound, and a low-molecular-weight water-soluble organic compound having one or more functional group(s) selected from the group consisting of amino group, hydroxyl group and carboxyl group, and having at least one of oxygen and nitrogen as heteroatom(s). In the fine metal carbide particles, the average particle diameter is 100 nm or less, the content of iron as impurities is 100 ppm or less, and the ratio of the total carbon amount is within ±0.3 wt % around a theoretical ratio of the total carbon amount calculated from the composition of the metal carbide.

8 Claims, 2 Drawing Sheets

FINE METAL CARBIDE PARTICLES AND METHODS OF MANUFACTURING THE SAME

TECHNICAL FIELD

The present invention relates to a metal carbide fine particles and a method of manufacturing the same, and more specifically, to a metal carbide fine particles of a metal belonging to Group 4, Group 5 and Group 6 elements on the periodic table, which are suitable as an initial material of a hard material used as cutting tools, an abrasion-resistant tool, a mold, a die and the like, are fine, and the amounts of metal impurities are very low, and a method of manufacturing the same.

BACKGROUND ART

For carbides of metals belonging to Group 4, Group 5 and Group 6 elements (Group IVa, Group Va and Group VIa elements in the old group number, respectively) on the periodic table, have been used as typical hard materials in wide application. For example, a cemented carbide predominantly composed of tungsten carbide is used as material for cutting tools and abrasion-resistant tools, titanium carbide is used as main material for cermet cutting tools, tantalum carbide and niobium carbide are used as an initial material of a cemented carbide used for watch cases and the like, and chromium carbide is used as material for hard coatings by sprayed coating method. With respect to these materials, an enhancement in their strength and hardness and an improvement in wear resistance have been desired.

Further, in recent years, a cemented carbide and a sintered tungsten carbide are used for molds for aspheric lenses, and requirement for a reduction of surface roughness is increasing reflecting the requirements for smaller, lighter weight and more precise optical equipment.

In order to respond to these requirements, it is essential to make an initial material powder finer and purer, and the needs of fine metal carbide particles having a small average particle diameter and a low concentration of impurities have increased.

Conventional methods used for manufacturing metal carbide powder include a method in which a metal and a carbon powder is mixed and a carbonization reaction is performed by heat-treating the mixture at an high temperature, a method in which metal oxide powders are reduced and mixed with carbon powders and heat-treated at an high temperature in a carburizing atmosphere in order to perform a carbonization reaction, and the like. However, a purification process having multiple steps for obtaining a metal or a metal oxide used as an initial material in these methods from initial mineral ores is extremely complicated, and this process constitutes a major cause of higher costs.

Since metallic impurities such as iron cause a decrease in the purity of the metal carbide and production of an abnormal structure when a sintered body is prepared, there is a problem of how to reduce the metallic impurities in manufacturing the metal carbide. However, in a conventional method, metallic impurities such as iron contamination resulting from a stainless boat which is used in reduction of a metal oxide, pyrolysis of a metal precursor, or carbonization of a metal are inevitable. Further, a carbon powder used as a carbon source often contains iron as impurities, and this is one of the causes of the contamination of a metal carbide with iron. Moreover, since most of the metal carbides manufactured by these methods have a large particle diameter of 1 μm or more, the metal carbides are pulverized to fine powders by milling for a long time with a ball mill and the like. Therefore, contamination with impurities such as iron resulting from a stainless steel pot or a cemented carbide ball media, and oxidation of a carbide powder are inevitable, and it is difficult to manufacture a metal carbide powder having a high purity of 99.9% or more.

Accordingly, a technique for manufacturing a high-purity nano powder by a build-up process without a heat-treating step and a pulverizing step causing the contamination with iron is desired.

For example, Patent Document 1 proposes a method of manufacturing a metal carbide comprising steps of: preparing a solution containing ammonium paratungstate and an organic acid such as glycine; drying the solution by spray drying method to make a solid precursor; calcining the solid in an inert environment to form a partially carburized metal; and heating the metal in a carburizing atmosphere to complete the carburization.

Patent Document 2 proposes a method of manufacturing a high-purity fine tungsten carbide powder comprising steps of drying a slurry formed by mixing a carbon powder in an aqueous solution of ammonium metatungstate; reducing the resulting mixture in a nitrogen atmosphere to prepare an intermediate product containing W, $W_2C$, and WC;, and mixing a carbon powder to the reduction product in such an amount that a W component is carbonized to WC composed of W and C in an atomic ratio of 1:1; and carbonizing the reduction product in a hydrogen atmosphere to manufacture a fine tungsten carbide powder having an average particle diameter of 0.5 μm or less.

Patent Document 3 proposes a method of manufacturing an ultrafine WC/TiC/Co composite powder in which the ultrafine WC/TiC/Co composite powder can be prepared at a low reaction temperature by a simple process comprising steps of: preparing an initial powder from a water-soluble salt containing W, Ti and Co by a spray drying method; removing moisture and a salt component from the powder by heating to convert the powder to an oxide powder; then mixing the oxide powder with carbon; and reducing and carburizing the resulting mixture in an atmosphere of a reducing gas or a nonoxidizing gas.

Patent Document 4 proposes a carbide powder having a maximum particle diameter of 150 nm or less which is obtained by subjecting a precursor solution prepared by dissolving a metal alkoxide (W, Ta, Nb, Cr, Si) and an organic compound having a functional group capable of coordinating to the metal alkoxide in an organic solvent to drying and a heat treatment in a nonoxidizing atmosphere, and a method of manufacturing the same.

Patent Document 5 proposes a tungsten carbide powder having a nano particle size and a method of manufacturing the same, comprising the first heat treatment step of heating a mixture of ultrafine tungsten oxide ($WO_3$ or $WO_{2.90}$) and a carbon powder to 1050 to 1200° C. in nitrogen to reduce and carbonize the mixture to an intermediate product in which W, $W_2C$, and WC coexist, and the second heat treatment step of heating the intermediate product, or the intermediate product subjected to pulverization and mixing to 900 to 1300° C. in H2 to carbonize the intermediate product to a tungsten carbide powder, as a method of manufacturing a tungsten carbide powder in which a ratio of a total carbon amount is 6.13±0.30 wt %, a free carbon amount is 0.3 wt % or less, an oxygen amount is 0.7 wt % by mass or less, an iron amount is 200 ppm or less, and an average particle diameter is 100 nm or less.

Patent Document 6 proposes a method in which a tungsten compound such as ammonium metatungstate or tungstic acid is used as a precursor composition, the precursor composition is reacted with hydrogen as a reducing agent and a carbon-based gas such as CO as a carbon source in a flow of these gases, and the reactant is caused to undergo a reduction and carbonization reaction in a furnace to manufacture a WC powder.

PRIOR ART DOCUMENTS

Patent Documents

Patent Document 1: Japanese Unexamined Patent Publication No. 10-259057
Patent Document 2: Japanese Unexamined Patent Publication No. 2003-112916
Patent Document 3: Japanese Unexamined Patent Publication No. 2001-73012
Patent Document 4: Japanese Unexamined Patent Publication No. 2008-105936
Patent Document 5: Japanese Unexamined Patent Publication No. 2005-335997
Patent Document 6: Japanese Unexamined Patent Publication No. 10-194717

SUMMARY OF THE INVENTION

Problems to be Solved by the Invention

In the method of manufacturing a metal carbide described in Patent Document 1, since it is necessary to further heat treatment in a carburizing atmosphere after calcining, the process is complicated and requiring a great deal of heat energy. Further, with this method, a mixed solution of an organic acid and an ammonium compound as an initial tungsten material is prepared, and the organic acid is used as an additive for dissolving ammonium paratungstate in water and carbide is obtained by heating the carburized metal in a carburizing atmosphere.

In the method of manufacturing a high-purity fine tungsten carbide powder described in Patent Document 2, since a carbon powder is used as a carbon source, a great deal of energy is required for diffusing carbon in a carbonization reaction, and a carbonization reaction temperature is high, and grain growth is promoted, and therefore, the particle diameter of the resulting WC powder is as large as 0.30 to 0.48 µm (300 to 480 nm).

As to the method of manufacturing an ultrafine WC/TiC/Co composite powder described in Patent Document 3, since cobalt is used as a catalyst, this method is not a method of manufacturing of metal carbide without cobalt.

In the carbide powder and the method of manufacturing the same described in Patent Document 4, a metal alkoxide is used as an initial material. Since alkoxides of Group 5 metals and Group 6 metals on the periodic table are very expensive, and easily react with water vapor in the air to cause hydrolysis and deterioration, they have problems in terms of manufacture such as the increase in production cost, the difficulty in handling and control, and the reduction in yield.

In the tungsten carbide powder and the method of manufacturing the same described in Patent Document 5, much heat energy is required since it is necessary to perform the heating step twice. Moreover, since this method further includes the step of pulverizing aggregation and necking of an intermediate product, which cause the growth of grains after the first heat treatment, to form an intermediate product obtained after the first heat treatment, there is a possibility of the contamination with metallic impurities.

In the tungsten carbide powder and the method of manufacturing the same described in Patent Document 6, it is necessary to raise the temperature quickly to avoid the production of $W_2C$ and the like, and in Examples, a temperature rise rate of 25° C./min is employed. However, such a quick temperature rise is impractical at an industrial production level. Further, it is described that a WC phase is produced only by changes in weight in a thermal analysis apparatus, and no crystal structure of a powder or a particle size is shown. Further, a carbon source is a carbon-based gas, and this method is not a manufacturing method in which a carbon source is contained in an initial material.

The present invention has been made in view of the above-mentioned circumstances, and an object thereof is to provide a metal carbide fine particles which do not require pulverization of an initial material, an intermediate and a product that causes the contamination with metallic impurities, which can promote a carbonization reaction uniformly at a lower temperature than the conventional methods, and which can be manufactured at low cost; and a method of manufacturing the same.

Means for Solving the Problems

A first aspect of the present invention solves the above-mentioned problems by providing a metal carbide fine particles prepared by heat-treating, in a nonoxidizing atmosphere or a vacuum atmosphere, a solid obtained by drying an aqueous complex solution containing a water-soluble metal compound, and a low-molecular-weight water-soluble organic compound having one or more functional group(s) selected from the group consisting of amino group, hydroxyl group and carboxyl group, and having only at least one of oxygen and nitrogen as heteroatom(s), wherein the average particle diameter of the metal carbide fine particles is 100 nm or less, the content of metallic impurities other than the metal carbide is 100 ppm or less, and the ratio of the total carbon amount is within ±0.3 wt % around a theoretical ratio of the total carbon amount calculated from the composition of the metal carbide.

In the present specification, the term "total carbon amount" refers to a total weight of carbon existing in the metal carbide fine particles, the term "ratio of the total carbon amount" refers to a ratio of the total carbon amount to the total weight of the metal carbide fine particles, and the term "theoretical ratio of the total carbon amount calculated from the composition of the metal carbide" refers to a value represented by (number of carbon atoms contained in metal carbide)× 12.011/(molecular weight of metal carbide) (when the value is represented in wt %, the value calculated from the above-mentioned formula is multiplied by 100). Here, 12.011 is the atomic weight of carbon.

By using a solid complex in which a metal compound as a metal source is combined with a water-soluble organic compound as a carbon source at a molecular level by a contact reaction of the metal compound with the organic compound in a solution, it becomes possible to promote a carbonization reaction uniformly at a lower temperature than with a conventional method, and fine metal carbide fine particles are prepared. In a mixed powder obtained by merely mixing a metal compound and an organic compound in water and drying the mixture, a metal carbide cannot be obtained at the calcining temperature of the present invention, and growth of grains occurs due to a heat treatment at an high temperature. It is important for preparing fine metal carbide also from this fact to make a state in which a metal source is combined with carbon at a molecular level. Moreover, since an inexpensive metal compound such as a water-soluble metal salt can be used in place of an expensive metal alkoxide costing several thousands of yen per gram, production cost can be reduced.

In the first aspect of the present invention, the metal compound may be a compound of one or more metals selected from the group consisting of Group 4 metals, Group 5 metals and Group 6 metals on the periodic table.

Here, "Group 4 metals, Group 5 metals and Group 6 metals on the periodic table" means any of titanium (Ti), vanadium (V), chromium (Cr), zirconium (Zr), niobium (Nb), molybdenum (Mo), hafnium (Hf), tantalum (Ta) and tungsten (W).

By use of any of these metal compounds as an initial material, fine metal carbide particles suitable as an initial material of a hard material such as a cemented carbide can be obtained.

In this case, the metal may be one or more metals selected from the group consisting of tungsten, chromium, vanadium and molybdenum.

The fine metal carbide particles containing these metals can be suitably used as an initial material of a hard material widely used.

A second aspect of the present invention solves the above-mentioned problems by providing fine metal carbide particles, wherein a matrix consist of a metal carbide or ceramic is doped with metal carbide prepared by heat-treating, in a nonoxidizing atmosphere or a vacuum atmosphere, a solid obtained by drying an aqueous complex solution containing a water-soluble metal compound, and a low-molecular-weight water-soluble organic compound having one or more functional group(s) selected from the group consisting of amino group, hydroxyl group and carboxyl group, and having only at least one of oxygen and nitrogen as heteroatom(s), the average particle diameter of the metal carbide fine particles are 100 nm or less, the content of iron as impurities is 100 ppm or less, and the ratio of the total carbon amount is within ±0.3 wt % around a theoretical ratio of the total carbon amount calculated from the composition of the metal carbide.

By doping the metal carbide in metal carbide fine particles having a uniform shape, a small average particle diameter and a low impurity content, which are different in physical or chemical properties such as the composition, crystal microstructure and density, are provided, and these metal carbide fine particles can be suitably employed for preparing a hard material having a unique function.

In addition, when the matrix is consist of the metal carbide, the metal composition of the metal carbide as a doping material may be the same therefor, as or different from that of the metal carbide composing the matrix.

In the present specification, "being doped with metal carbide" means both of a states that metal carbide exists into a matrix and doped metal carbide exists so as to surround the matrix surface.

A third aspect of the present invention solves the above-mentioned problems by providing a method of manufacturing a metal carbide fine particles including step A of preparing an aqueous complex solution containing a water-soluble metal compound, and a low-molecular-weight water-soluble organic compound having one or more functional groups selected from the group consisting of amino group, hydroxyl group and carboxyl group and having only one or both of oxygen and nitrogen as heteroatom(s); step B of drying the aqueous complex solution; and step of C of heat-treating a solid obtained in step B at a temperature of 1000° C. to 1300° C. both inclusive in a nonoxidizing atmosphere or a vacuum atmosphere.

By using a solid complex obtained by the reaction of a metal compound as a metal source with a water-soluble organic compound as a carbon source in a solution, in which the metal compound is combined with the organic compound at a molecular level, there is provided a method of manufacturing fine metal carbide particles enabling a uniformity carbonization reaction at lower temperature than in conventional methods and fine metal carbide particles having a small average particle diameter are obtained by inhibiting of unnecessary growth of particles effectively. Moreover, since an inexpensive metal compound such as a water-soluble metal salt can be used in place of an expensive metal alkoxide costing several thousands of yen per gram, production cost can be reduced.

In the third aspect of the present invention, the metal compound may be a compound of one or more metals selected from the group consisting of Group 4 metals, Group 5 metals and Group 6 metals on the periodic table.

In this case, the metal may be one or more metals selected from the group consisting of tungsten, chromium, vanadium and molybdenum.

In this case, it is preferable that the metal compound is a polyacid salt or a heteropolyacid salt, and in step A, an aqueous ammonia solution is used for preparing the aqueous complex solution. It is preferable that the pH of the aqueous ammonia solution be 11 to 12.

Here, a "polyacid" is a polynuclear complex (condensed acid) which is formed by condensing a plural of basic units having polyhedral structure such as a tetrahedron, a quadrangular pyramid or an octahedron in which oxyanions are bound to a transition metal ion such as $W^{6+}$, $V^{5+}$ or $Nb^{5+}$ in tetra- to hexa-coordinated manner so that ridges or apexes of the polyhedrons are shared, and a "heteropolyacid" refers to a polyacid containing oxygen and two or more (metal) elements of polyacids.

Since the polyacid salt or heteropolyacid is an intermediate in the step of purifying a metal, they are inexpensive. By using these as a metal compound, production cost of the metal carbide fine particles can be reduced. Further, by using an aqueous ammonia solution as a solvent for preparing the aqueous complex solution, particularly by using an aqueous ammonia solution with a pH of 11 or higher, the solubility of the metal compound can be improved.

In the third aspect of the present invention, the molar ratio of the water-soluble organic compound to the metal compound is preferably 0.8 or more to 1.3 or less.

By keeping the molar ratio of the water-soluble organic compound to the metal compound in the above-mentioned range, highly pure fine metal carbide particles can be obtained without the lack of a carbon source and formation of free carbon.

In the third aspect of the present invention, the water-soluble organic compound is preferably one or more hydroxycarboxylic acids selected from the group consisting of citric acid, isocitric acid, tartaric acid, malic acid, glycolic acid, lactic acid, 3-hydroxypropionic acid and 3-hydroxybutyric acid.

Since these hydroxycarboxylic acids are excellent in water solubility and can form a stable complex with a metal compound in an aqueous solution, they can be suitably used as a carbon source.

In the third aspect of the present invention, this manufacturing method may further include step D of preparing a slurry by mixing fine metal carbide particles or ceramic fine particles for forming a matrix with the aqueous complex solution between step A and step B, and may heat-treat a solid containing the metal carbide or ceramic fine particles in step C to dope into the metal carbide derived from the metal contained in the aqueous complex solution into a matrix made of the metal carbide or ceramic fine particles.

By doping the metal carbide into a matrix consisting of a metal carbide or fine ceramic particles, it is possible to obtain fine metal carbide particles having different physical or chemical properties such as the composition, crystal structure and density, and having high purity and a uniform shape. Further, since the fine metal carbide particles or fine the ceramic particles, which exist as a matrix, act as a grain growth inhibitor, it is possible to prepare metal carbide fine particles having a small average particle diameter and a uniform shape.

When the matrix is consisting of the metal carbide, the metal composition of the doped metal carbide, may be the same or different from that of the metal carbide composing the matrix.

Effects of the Invention

In accordance with the present invention, since it is unnecessary to pulverize an initial material, an intermediate and a product that causes the contamination with metallic impurities, fine and highly pure metal carbide particles, which hardly produces an abnormal structure in sintering, is provided. Further, since a carbonization reaction can be uniformly promoted at a lower temperature by using, a reaction intermediate that a solid metal complex in which a metal source and an organic compound as a carbon source are uniformly distributed at a molecular level, excessive growth of a crystal grain can be inhibited, and thereby fine metal carbide particles having a small average particle diameter can be prepared. Moreover, in accordance with the present invention, the fine metal carbide particles can be manufactured at a much lower cost than that of a conventional manufacturing method since an inexpensive metal compound is employed as an initial material and the fine metal carbide particles can be manufactured by a method which requires fewer heat treatments and a heat treatment at a lower carbonization temperature than a conventional technique of undergoing pyrolysis-reduction-carbonization.

EMBODIMENTS OF THE INVENTION

Figure 1:
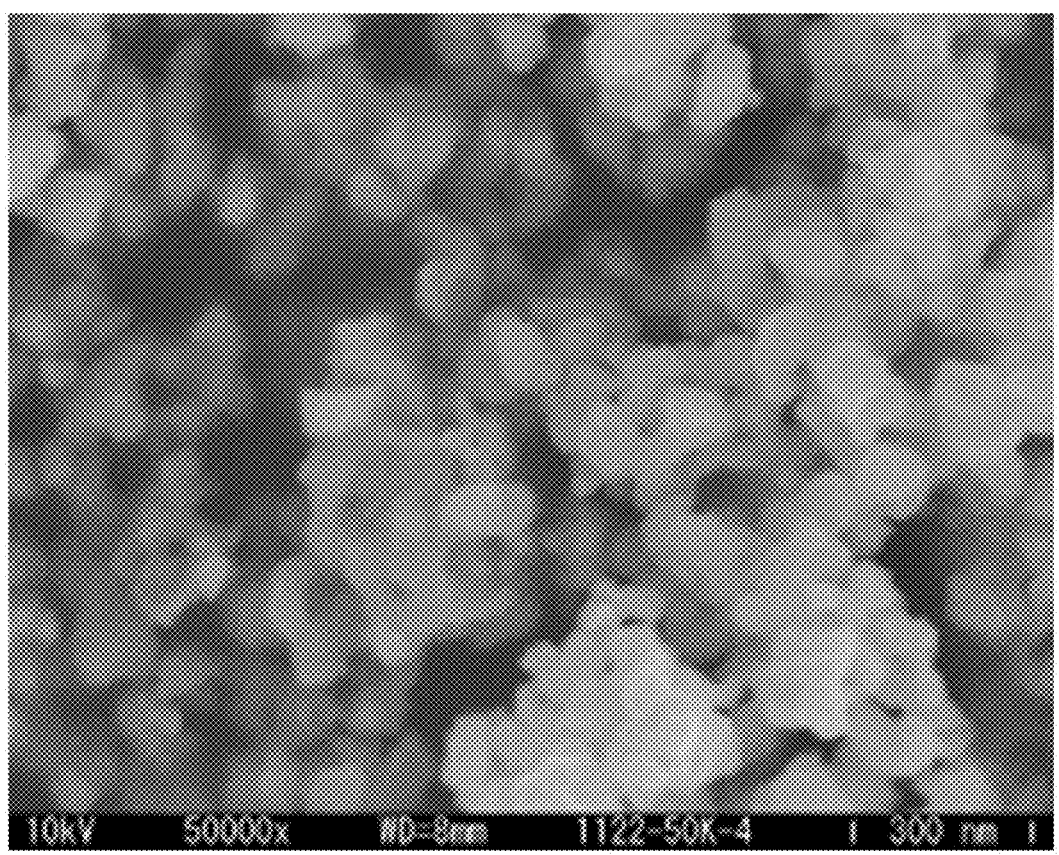
FIG. 1 is a scanning electron micrograph of fine tungsten carbide particles manufactured in Example 2.

Hereinafter, embodiments of the present invention will be described for understanding of the present invention.

The fine metal carbide particles of an embodiment of the present invention is manufactured by a method of manufacturing fine metal carbide particles including step A of preparing an aqueous complex solution containing a water-soluble metal compound, and a low-molecular-weight water-soluble organic compound having one or more functional groups selected from the group consisting of amino group, hydroxyl group and carboxyl group having only one or both of oxygen and nitrogen as heteroatom(s); step B of drying the aqueous complex solution; and step of C of heat-treating a solid obtained in step B at a temperature of 1000° C. to 1300° C. in a nonoxidizing atmosphere or a vacuum atmosphere.

In step A, the aqueous complex solution is prepared containing a water-soluble metal compound, and a low-molecular-weight water-soluble organic compound having one or more functional groups selected from the group consisting of amino group, hydroxyl group and carboxyl group having only one or both of oxygen and nitrogen as heteroatom(s).

Since a water-soluble metal compound is used as a metal source, the cost can be reduced to about several tenth part of the cost in the case of a metal alkoxide. As the metal compound, any metal compound having adequate water solubility can be used. Specific examples of the metal compound include inorganic acid salts such as nitrate salt; halides such as chloride; organic acid salts such as acetate salt; hydroxo complexes of metals; free acids or ammonium salts of a polyacid or a heteropolyacid. Here, a "hydroxo complex" refers to a metal complex in which hydroxide ions ($OH^-$) are coordinated, and a "polyacid" is a polynuclear complex (condensed acid) which is formed by condensing a plural of basic units having polyhedral structure such as a tetrahedron, a quadrangular pyramid or an octahedron in which oxyanions are bound to a transition metal ion such as $W^{6+}$, $V^{5+}$ or $Nb^{5+}$ in tetra- to hexa-coordinated manner so that ridges or apexes of the polyhedrons are shared, and a "heteropolyacid" refers to a polyacid containing oxygen and two or more (metal) elements of polyacids.

Specific examples of the metal include Group 4 metals, Group 5 metals and Group 6 metals, a carbide of which is used as an initial material of a hard material, that is, titanium (Ti), vanadium (V), chromium (Cr), zirconium (Zr), niobium (Nb), molybdenum (Mo), hafnium (Hf), tantalum (Ta) and tungsten (W), particularly tungsten (W), chromium (Cr), vanadium (V) and molybdenum (Mo). As a metal compound containing these metals, a polyacid or a heteropolyacid of these metals, or an ammonium salt thereof is preferably used. The reason is that production cost of the fine metal carbide particles is reduced, since the polyacid or heteropolyacid, or ammonium salt thereof, which is an intermediate produced as a metal compound in the step of purifying a metal, is inexpensive and excellent in water solubility. For example, in the manufacture of fine tungsten carbide particles, use of tungstic acid, ammonium metatungstate, or ammonium paratungstate, which is an intermediate produced in the step of purifying tungsten, as an initial material is preferable since production cost is reduced. Further, ammonium vanadate, ammonium chromate and ammonium molybdate are also preferable because they have high solubility in water and are inexpensive.

When the polyacid or heteropolyacid such as tungstic acid, ammonium metatungstate or ammonium paratungstate, or salt thereof is used as the metal compound, an aqueous ammonia solution, in which the solubility of these metal compounds is high, is used as a solvent for preparing the aqueous complex solution. It is necessary that ammonia (a cation source) with a sufficient concentration is present in the aqueous ammonia solution in order to have a charge balance with anions of the polyacid or heteropolyacid. To achieve this, it is necessary that the pH of the aqueous ammonia solution is 11 or more and 12 or less, preferably 11.4 or more and 11.8 or less. The pH of the aqueous ammonia solution can be adjusted by the amount of concentrated ammonia water added to water in preparation of the aqueous ammonia solution, and for example, the concentrated ammonia water may be added in an amount of 5 to 10 wt % with respect to the amount of water.

When the pH of the aqueous ammonia solution is less than 11, the polyacid or heteropolyacid cannot be adequately dissolved, and when the pH is more than 12, this may cause detrimental effects that excessive ammonia comes to coordinate to a metal atom, and a part of the water-soluble organic compound as a carbon source is detached from the metal complex and then them are precipitated, and then increase the amount of free carbon.

When ammonium vanadate, ammonium chromate or ammonium molybdate is used, water can be used as a solvent.

Since it is possible to realize a state in which a metal source and a carbon source are uniformly distributed at a molecular level by using, as a carbon source, a water-soluble organic compound having one or more functional groups selected from the group consisting of amino group, hydroxyl group and carboxyl group, which have a coordinating ability to a metal ion to form a complex with a metal ion, a carbonization reaction can be uniformly promoted at a lower temperature than in the past. Therefore, excessive growth of a crystal grain can be inhibited, and thereby fine metal carbide particles having a small average particle diameter can be obtained.

One or more water molecules may coordinate to a metal ion other than the water-soluble organic compound.

The water-soluble organic compound has a functional group containing a heteroatom having a coordinating ability to a metal ion. Examples of suitable heteroatoms include oxygen and nitrogen, and phosphorus and sulfur are not preferable. The oxygen and nitrogen atoms form carbon dioxide and a nitrogen molecule, respectively, to dissipate as a gas in a heat treatment in step C, but phosphorus and sulfur may form an non-volatile compound and remain in the fine metal carbide particles to decrease the purity.

As the water-soluble organic compound, an organic acid is preferable, which has one or more carboxyl groups (—COOH), is inexpensive and excellent in water solubility, and can easily form a complex by being mixed with a metal compound in water to improve the solubility of the metal compound. In order to form a stable metal complex by a chelate effect, the water-soluble organic compound preferably further has two or more carboxyl groups, or one or more functional groups selected from the group consisting of a hydroxyl group (OH), amino group (—$NH_2$) and imino group (—NH—).

Specific examples of the water-soluble organic compounds include monobasic acids such formic acid, acetic acid and propionic acid; dibasic acids such as oxalic acid, malonic acid, succinic acid and maleic acid; hydroxycarboxylic acids (or polyhydric carboxylic acids) such as citric acid, isocitric acid, tartaric acid, malic acid, glycolic acid, lactic acid, 3-hydroxypropionic acid, 3-hydroxybutyric acid, mevalonic acid and glycolic acid; and amino acids (natural amino acids excluding cysteine and methionine, which are sulfur-containing amino acids) such as glycine, alanine, valine, leucine, isoleucine, proline, serine, threonine, asparagine acid, glutamic acid, asparagine, glutamine, lysine, histidine, arginine, tryptophan, phenylalanine and tyrosine. Among these, hydroxycarboxylic acids do not cause uneven distribution of the carbon source and are effective in suppressing the amount of free carbon since they are highly able to form a complex with a metal and can easily form a uniform solid metal complex without being precipitated in the stage of drying an aqueous metal complex solution.

Among the hydroxycarboxylic acids, particularly, hydroxymonocarboxylic acids, hydroxydicarboxylic acids and hydroxytricarboxylic acids each having 2 to 10 carbon atoms are preferable, and specific examples thereof include citric acid, isocitric acid, tartaric acid, malic acid, glycolic acid, lactic acid, 3-hydroxypropionic acid and 3-hydroxybutyric acid.

The molar ratio of the metal compound to the water-soluble organic compound in the aqueous metal complex solution is preferably 0.8 or more to 1.3 or less, and more preferably 0.9 to 1.1 in the case of using citric acid as the water-soluble organic compound. In the case of a polynuclear complex such as a polyacid or a heteropolyacid, as a molar number of the metal compound, the number of metal ions is used in place of the number of ions of a polyacid or a heteropolyacid. When the molar ratio is less than 0.8, since the amount of the carbon source is insufficient, the production amount of a metal carbide containing a small amount of a free metal or metal carbide having small number of combined carbon increases. When the molar ratio is more than 1.3, since the amount of carbon is excessive, free carbon is formed, and therefore both cases result in a reduction in the purity of the fine metal carbide particles.

It is difficult to determine the optimal molar ratio of the metal compound to the water-soluble organic compound unambiguously since it depends on the kind and calcining conditions of the metal compound and the water-soluble organic compound. However, for example, it was empirically found that when a ratio of carbon, which is contained in a carbide intermediate obtained by carbonizing, at a temperature of 900 to 1000° C., a solid metal complex obtained by drying an aqueous metal complex solution in step B (i.e., weight of carbon/weight of carbide intermediate), is denoted by R(T.C.), and a theoretical ratio of the total carbon amount calculated from the composition of the metal carbide as an end product (i.e., (number of carbon atoms contained in metal carbide)×12.011/(molecular weight of metal carbide)) is denoted by Cal(T.C.), the above-mentioned molar ratio is preferably set in such a way that the ratio R(T.C.)/Cal(T.C.) is 1 to 1.2.

When the ratio R(T.C.)/Cal(T.C.) is more than 1.2, it is not preferable since the amount of free carbon produced increases. On the other hand, when the ratio R(T.C.)/Cal (T.C.) is less than 1, a substance other than a desired carbide composition or a free metal is produced.

The solubility of the metal complex in the aqueous complex solution is preferably 5% or more at 25° C. When the solubility at 25° C. is less than 5%, a large amount of an aqueous complex solution is required, and therefore productivity is deteriorated.

When the polyacid or heteropolyacid, or an ammonium salt thereof is used as the metal compound, the addition of ammonia water to an aqueous complex solution is preferable since this addition has the effects of increasing the solubility of the metal compound, controlling the composition of the complex by using an increase in the amount of an anion (hydroxo complex) to be introduced into the complex to maintain a charge balance associated with the increase of a cation concentration resulting from ammonia addition, and stabilizing a metal complex.

An aqueous solution other than ammonia water can be used as long as the same effects as those described above can be achieved.

In step B, the aqueous metal complex solution prepared in step A is dried to obtain a solid metal complex as a reaction intermediate.

Herein, "dry" refers to remove water as a solvent from the aqueous metal complex solution, and this can be carried out by use of any publicly known process such as distillation of water under a normal pressure or a reduced pressure, freeze-drying, or spray-drying.

A solid metal complex thus obtained is pulverized as required, and is subjected to a heat treatment in step C. Pulverization is carried out by use of an agate mortar and the like in order to avoid any contamination with metallic impurities such as Fe, Co, and Ni.

In addition, when a manufacturing apparatus for a spray pyrolysis method and the like, in which vaporization and a reduction/carbonization reaction of a solution is completed in an apparatus, is used, the step of drying a complex solution may be omitted and the complex solution may be directly used as an initial material of the spray pyrolysis method.

In step C, the solid obtained in step B is heat-treated at a temperature of 1000° C. to 1300° C. in a nonoxidizing atmosphere or a vacuum atmosphere to obtain fine metal carbide particles. Any publicly known vacuum furnace and a vacuum atmospheric furnace, which are operable in the above-mentioned temperature range, can be used for the heat treatment. Examples of the nonoxidizing atmosphere include a nitrogen atmosphere and an argon atmosphere. Further, a heat-treating temperature is any temperature in the range of 1000° C. to 1300° C., more preferably 1050° C. or higher and 1200° C. or lower. When the heat-treating temperature is lower than 1000° C., length of time for carbonization is extended to deteriorate productivity, and when the heat-treating temperature is higher than 1300° C., it is not preferable because a significant growth of grains of the metal carbide is further promoted. A heat-treating time varies according to the heat-treating temperature, and the type and average particle diameter of the fine metal carbide particles, and for example, it is 1 hour or more and 10 hours or less.

In order to manufacture fine metal carbide particles in which a matrix is doped with a metal compound as required, the manufacturing method of the present invention may further include step D of preparing a slurry by mixing fine metal carbide particles or ceramic fine particles for forming a matrix with the aqueous complex solution between step A and step B, and may heat-treat a solid containing the metal carbide or ceramic fine particles in step C to dope the metal carbide derived from a metal contained in the aqueous complex solution into matrix made of the metal carbide or fine ceramic fine particles. As the fine metal carbide particles and the ceramic fine particles for forming a matrix, any publicly known metal carbide or ceramic fine particles can be employed as long as their average particle diameter is smaller than that of the ultimately obtained fine metal carbide particles. As the fine metal carbide particles, commercially available one may be used, or one manufactured by use of the method of the present embodiment may be used.

Since the fine metal carbide particles or the ceramic fine particles, which exist as a matrix, act as a grain growth inhibitor and effectively inhibit unnecessary growth of particles, it is possible to prepare fine metal carbide particles which have a small average particle diameter and are uniformly dispersed in a matrix.

It is also possible to manufacture fine metal carbide particles that metal compound is doped in a matrix by preparing a solution containing two or more types of metal compounds in step A in place of the method including the step described above.

An average particle diameter of the fine metal carbide particles thus obtained varies according to the type of the metal carbide and production conditions, and it is usually 100 nm or less. Here, the "average particle diameter" refers to a diameter of a sphere circumscribing the fine metal carbide particles. When the average particle diameter is more than 100 nm, it becomes difficult to use the fine metal carbide particles as an initial material of a cemented carbide and a precise die since such an average particle diameter results in the reduction in strength and the increase in surface roughness of a sintered body.

When the average particle diameter is less than 30 nm, since such an average particle diameter easily causes the formation of a secondary particle due to aggregation, it becomes difficult to use the fine metal carbide particles as an initial material of a cemented carbide and a precise die, and handling becomes difficult, and therefore the average particle diameter of the metal carbide fine particles is preferably 30 nm or more.

Since the pulverizing step using a ball mill and the like is not employed, the amount of iron contained in the metal carbide fine particles as impurities is 100 ppm or less.

Further, by controlling the molar ratio of the metal compound to the water-soluble organic compound as described above, a ratio of the total carbon amount contained in the fine metal carbide particles can be defined to be within ±0.3 wt % about a theoretical ratio (=Cal(T.C.)×100) of the total carbon amount calculated from the composition of the metal carbide. An amount of free carbon is 0.3 wt % or less of a theoretical ratio (=Cal(T.C.)×100) of the total carbon amount calculated from the composition of the metal carbide, preferably 0.2 wt % or less, and more preferably 0.1 wt % or less.

Due to the characteristics described above, the resulting fine metal carbide particles can be suitably used as an initial material of a cemented carbide which is used for cutting tools, abrasion-resistant tools, and molds and dies for precision machining such as molds for an aspheric lens.

EXAMPLES

Figure 2:
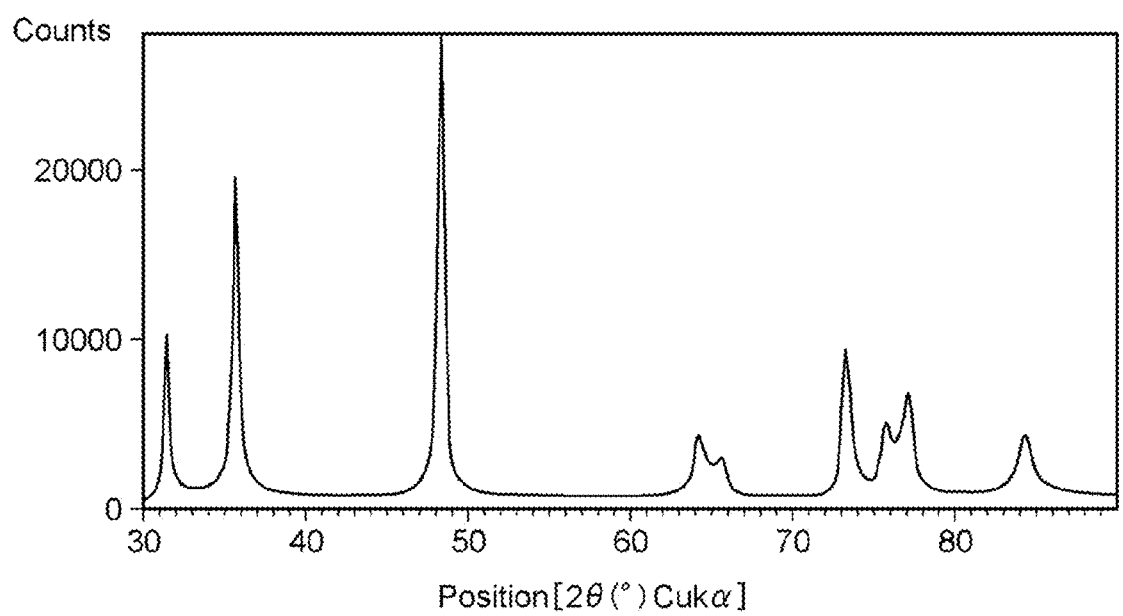
FIG. 2 is a powder X-ray diffraction pattern of the fine tungsten carbide particles.

Next, examples which have been carried out in order to verify the advantages of the present invention will be described. Herein, FIG. 1 is a scanning electron micrograph of fine tungsten carbide particles manufactured in Example 2, and FIG. 2 is a powder X-ray diffraction pattern of the fine tungsten carbide particles.

A shape of the metal carbide fine particles was observed by a scanning electron microscope (SEM), and an average particle diameter of the fine particles was determined by an image analysis. A crystal structure was determined by powder X-ray diffraction measurement.

The total carbon amount of the fine particles was analyzed by an infrared absorption method. The content of an element of metal impurities was determined from the result of inductively-coupled plasma (ICP) emission spectrometry.

Production of Tungsten Carbide Fine Particles

Examples 1 to 4, and Comparative Examples 1 to 4

Tungsten carbide fine particles were manufactured under various conditions different in the molar ratio between anhydrous citric acid and tungstic acid, the calcining atmospheres and the calcining temperature. Hereinafter, the case shown as Example 2 in the following Table 1 will be described.

To 160 ml of an ammonia aqueous solution with a pH of 11.6, 22 g of tungstic acid was added. After dissolution of tungstic acid, 17 g of anhydrous citric acid was added as a carbon source, and the resulting mixture was stirred until a metal complex solution is formed. All of the above-mentioned steps were carried out with stirring. Next, the metal complex solution was dried, and the resulting solid was pulverized with an agate mortar. The resulting powder was put in a crucible made of graphite and heated up to 1150° C. in an argon atmosphere or in a vacuum. Then the powder was maintained at this temperature for 4 hours, and thereafter naturally cooled to room temperature.

The molar ratio between anhydrous citric acid and tungstic acid, the calcining atmosphere, and the calcining temperature in Examples 1 to 4 and Comparative Examples 1 to 4 are as shown in the following Table 1.

TABLE 1

|  | Anhydrous citric acid/Tungstic acid | Calcining atmosphere | Calcining temperature (° C.) | Main component other than WC | Particle diameter (nm) | Total carbon amount (%) | Free carbon amount (%) | Combined carbon amount (%) | Iron amount (ppm) |
|---|---|---|---|---|---|---|---|---|---|
| Example 1 | 1 | Ar | 1000 | — | 60 | 6.12 | 0.18 | 5.94 | <10 |
| Example 2 | 1 | Ar | 1150 | — | 80 | 6.15 | 0.07 | 6.08 | <10 |
| Example 3 | 0.8 | Ar | 1150 | — | 78 | 6.11 | 0.13 | 5.98 | <10 |
| Example 4 | 1.3 | Vacuum | 1300 | — | 95 | 6.38 | 0.29 | 6.09 | <10 |
| Comparative Example 1 | 0.7 | Ar | 1000 | $W_2C$ | — | — | — | — | <10 |
| Comparative Example 2 | 1.5 | Vacuum | 1150 | — | — | 7.25 | 1.15 | 6.1 | <10 |
| Comparative Example 3 | 1 | Ar | 900 | $WO_2$ | — | — | — | — | <10 |
| Comparative Example 4 | 1.3 | Vacuum | 1350 | — | 150 | 6.35 | 0.25 | 6.1 | <10 |

As shown in Examples 1 to 4, under the conditions where the molar ratio between anhydrous citric acid and tungstic acid is 0.8 or more to 1.3 or less, and the calcining temperature is 1000 to 1300° C., high-purity tungsten carbide (WC) fine particles having a particle diameter of 100 nm or less, a free carbon amount of 0.3 wt % or less, and an iron amount of 10 ppm was obtained. On the other hand, when the molar ratio between anhydrous citric acid and tungstic acid was less than 0.8, $W_2C$ was produced as a by-product (Comparative Example 1), and when the molar ratio was more than 1.3, a free carbon amount increased (Comparative Example 2). Further, when the calcining temperature was lower than 1000° C., the production of a carbide does not proceed adequately and $WO_2$ was produced as a by-product (Comparative Example 3), and when the calcining temperature was higher than 1300° C., growth of a grain proceeded excessively and a particle diameter increased (Comparative Example 4).

FIG. 1 shows a scanning electron micrograph (SEM) of a tungsten carbide fine particles manufactured in Example 2. It was found from this micrograph that the average particle diameter was about 80 nm. From the powder X-ray diffraction pattern of FIG. 2, it was verified that this fine particles was a crystal of tungsten carbide (WC). The total carbon amount was 6.15 wt % and this result agreed with a theoretical value (6.13 wt %) well. The content of iron as impurities was 10 ppm or less.

Example 5

Production of Vanadium Carbide Fine Particles

To 300 ml of distilled water, 15 g of ammonium vanadate was added, and the resulting mixture was stirred to dissolve ammonium vanadate. Then, 31.6 g of anhydrous citric acid was added as a carbon source, and the resulting mixture was stirred until a uniform solution was obtained.

Next, the aqueous metal complex solution thus obtained was dried, and the resulting solid was pulverized with an agate mortar. The resulting powder was put in a crucible made of graphite and heated up to 1100° C. in an argon gas flow. Then the powder was maintained at this temperature for 4 hours, and thereafter naturally cooled to be heat-treated to obtain a composition.

Example 6

Production of Chromium Carbide Fine Particles

To 200 ml of distilled water, 40 g of ammonium chromate was added, and the resulting mixture was stirred to dissolve ammonium chromate. Then, 50.5 g of anhydrous citric acid was added as a carbon source, and the resulting mixture was stirred until a uniform solution was obtained.

Next, the aqueous metal complex solution thus obtained was dried, and the resulting solid was pulverized with an agate mortar. The resulting powder was put in a crucible made of graphite and heated up to 1050° C. in an argon gas flow. Then the powder was maintained at this temperature for 4 hours, and thereafter naturally cooled to be heat-treated to obtain a composition.

Example 7

Production of Molybdenum Carbide Fine Particles

To 300 ml of distilled water, 15 g of hexaammonium heptamolybdate tetrahydrate was added, and the resulting mixture was stirred to dissolve hexaammonium heptamolybdate tetrahydrate. Then, 16.8 g of anhydrous citric acid was added as a carbon source, and the resulting mixture was stirred until a uniform solution was obtained.

Next, the aqueous metal complex solution thus obtained was dried, and the resulting solid was pulverized with an agate mortar. The resulting powder was put in a crucible made of graphite and heated up to 1150° C. in an argon gas flow. Then the powder was maintained at this temperature for 4 hours, and thereafter naturally cooled to be heat-treated to obtain a composition.

The molar ratio between anhydrous citric acid and ammonium vanadate, ammonium chromate or hexaammonium heptamolybdate tetrahydrate, the calcining atmosphere and the calcining temperature in Examples 5 to 7 are as shown in the following Table 2.

TABLE 2

| | Metal compound | Anhydrous citric acid/Metal compound | Calcining atmosphere | Calcining temperature (°C.) | Crystal phase | Particle diameter (nm) | Total carbon amount (%) | Free carbon amount (%) | Combined carbon amount (%) | Iron amount (ppm) |
|---|---|---|---|---|---|---|---|---|---|---|
| Example 5 | Ammonium vanadate | 1.28 | Ar | 1100 | $V_8C_7$ | 89 | 16.85 | 0.20 | 16.65 | <10 |
| Example 6 | Ammonium chromate | 1 | Ar | 1050 | $Cr_3C_2$ | 98 | 13.42 | 0.18 | 13.24 | <10 |
| Example 7 | Hexaammonium heptamolybdate | 0.8 | Ar | 1150 | $Mo_2C$ | 90 | 6.05 | 0.20 | 5.85 | <10 |

As shown in Examples 5 to 7, also in the case of vanadium, chromium or molybdenum, high-purity metal carbide ($V_8C_7$, $Cr_3C_2$ or $Mo_2C$, respectively) fine particles having a particle diameter of 100 nm or less, a free carbon amount of 0.3 wt % or less, and an iron amount of 10 ppm or less were obtained under the conditions where the molar ratio between anhydrous citric acid and the metallic ammonium salt is 0.8 or more to 1.3 or less, and the calcining temperature is 1000 to 1300° C.

In addition, malic acid, tartaric acid and 3-hydroxybutyric acid were used as water-soluble organic acids and fine metal carbide particles were prepared under the same conditions as in Examples 1 to 7. As a result, in any case of malic acid, tartaric acid and 3-hydroxybutyric acid, high-purity metal carbide fine particles having a particle diameter of 100 nm or less, a free carbon amount of 0.3 wt % or less, and an iron amount of 10 ppm or less were obtained.

The invention claimed is:

1. A method of manufacturing fine metal carbide particles having an average particle diameter of 100 nm or less comprising:
    step A of preparing an aqueous complex solution containing a water-soluble metal compound, and a low-molecular-weight water-soluble carboxylic acid having one or more carboxylic group(s) and one or more amino group(s) and/or hydroxyl group(s), and having only at least one of oxygen and nitrogen as heteroatom(s);
    step B of drying the aqueous complex solution; and
    step C of heat-treating a solid obtained in step B at a temperature of 1000° C. to 1300° C. both inclusive in a nonoxidizing atmosphere or a vacuum atmosphere.

2. The method of manufacturing fine metal carbide particles according to claim 1, wherein the metal compound is a compound of one or more metals selected from the group consisting of Group 4 metals, Group 5 metals and Group 6 metals on the periodic table.

3. The method of manufacturing fine metal carbide particles according to claim 2, wherein the metal is one or more metals selected from the group consisting of tungsten, chromium, vanadium and molybdenum.

4. The method of manufacturing fine metal carbide particles according to claim 3, wherein the metal compound is a polyacid salt or a heteropolyacid salt, and in step A, an aqueous ammonia solution is used for preparing the aqueous metal complex solution.

5. The method of manufacturing fine metal carbide particles according to claim 4, wherein a pH of the aqueous ammonia solution is 11 or more and 12 or less.

6. The method of manufacturing fine metal carbide particles according to claim 1, wherein a molar ratio of the water-soluble carboxylic acid to the metal compound is 0.8 or more to 1.3 or less.

7. The method of manufacturing fine metal carbide particles according to claim 1, wherein the water-soluble carboxylic acid is one or more hydroxycarboxylic acids selected from the group consisting of citric acid, isocitric acid, tartaric acid, malic acid, glycolic acid, lactic acid, 3-hydroxypropionic acid and 3-hydroxybutyric acid.

8. The method of manufacturing fine metal carbide particles according to claim 1, further comprising step D of preparing a slurry by mixing a metal carbide fine particles or ceramic fine particles for forming a matrix with the aqueous complex solution between step A and step B, and wherein a solid containing the metal carbide or ceramic fine particles is heat-treated in step C to dope a matrix consisting of the metal carbide or ceramic fine particles with the metal carbide derived from the metal contained in the aqueous complex solution.

* * * * *